Sept. 25, 1951 R. B. DOME 2,569,296

FREQUENCY CONVERTER WITH PLURAL SELECTABLE OSCILLATORS

Filed May 12, 1948

Inventor:
Robert B. Dome,
by Merton D. Morse
His Attorney.

Patented Sept. 25, 1951

2,569,296

UNITED STATES PATENT OFFICE 2,569,296

FREQUENCY CONVERTER WITH PLURAL SELECTABLE OSCILLATORS

Robert B. Dome, Geddes Township, Onondaga County, N. Y., assignor to General Electric Company, a corporation of New York Application May 12, 1948, Serial No. 26,498

6 Claims. (Cl. 250—20)

This invention relates to radio tuning systems of the push button type, and more particularly to such tuning systems that may be utilized in frequency modulation radio receivers and the like.

It is an object of this invention to provide in a radio receiver, a push button tuning system that is simple and reliable in operation and economical to construct.

It is a further object of this invention to provide such a push button tuning system which utilizes a single bank of contacts only in the push button circuit, and whereby the switching required for individual settings of the receiver is accomplished by means of a single contact.

Yet another object of this invention is to provide such a tuning system whereby tuning of a frequency modulation receiver is accomplished without necessitating the switching of any of the radio frequency determining elements in local heterodyning oscillator circuit of the receiver.

Figure 2:
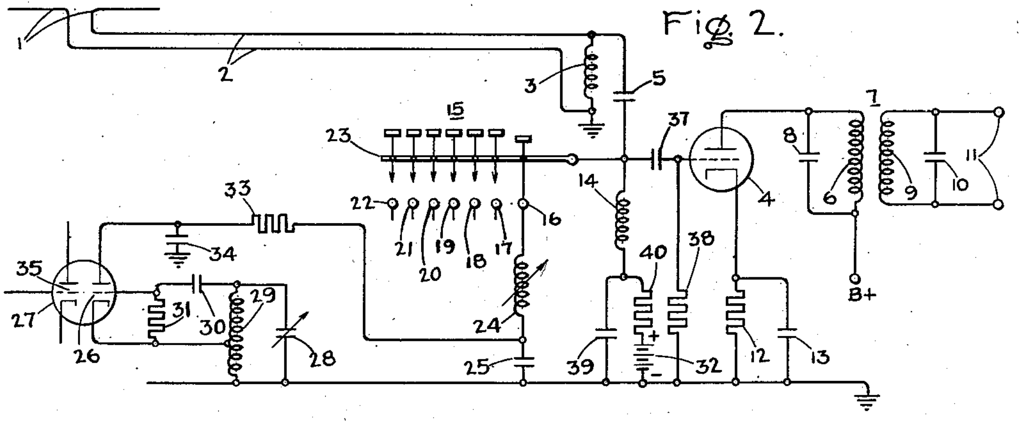
Figure 3:
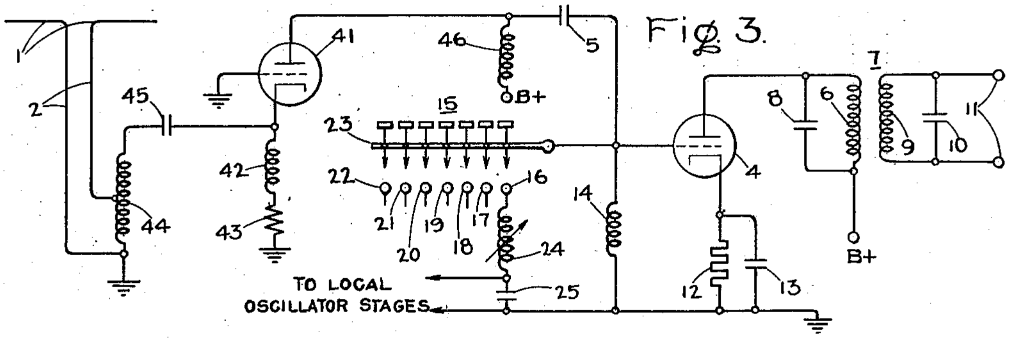

The features of this invention which are believed to be new are set forth with particularity in the appended claims. The invention itself, however, together with further objects and advantages thereof, may best be understood by reference to the following description when taken in conjunction with the accompanying drawing in which, Fig. 1 shows one embodiment of the invention, and Fig. 2 shows a modification thereof, and Fig. 3 shows the proposed tuning system utilized in a radio receiver and preceded by a radio frequency amplifier stage.

Figure 1:
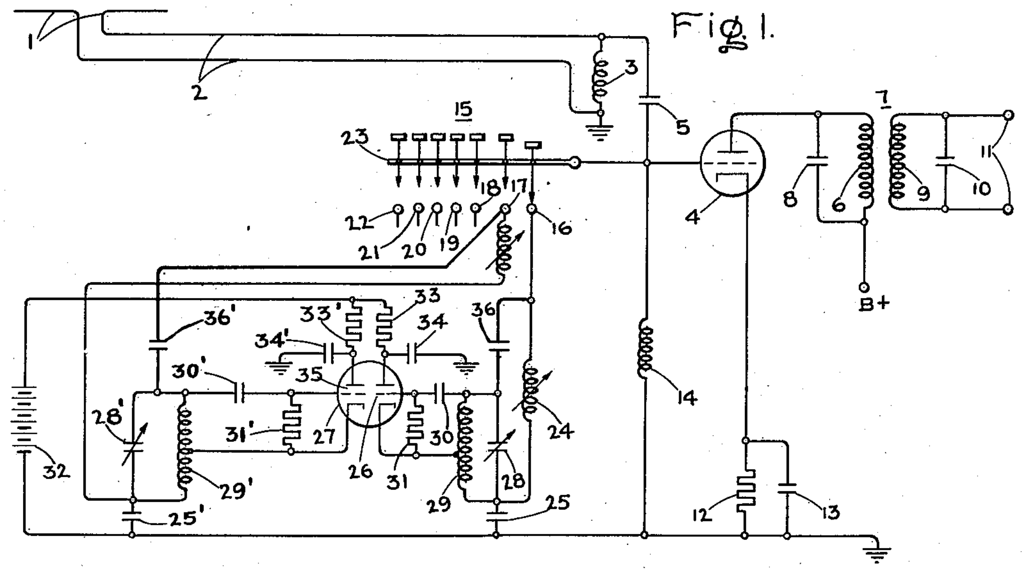

Referring now to Fig. 1 a portion of a radio receiver, which may be of the frequency modulation type is shown therein, the receiver being coupled to an antenna 1, and signals received by the antenna being transmitted to the receiver by means of transmission line 2. A shunt inductance 3 is coupled across line 2 and serves to reduce low frequency interference intercepted by antenna 1. Signals received by the antenna are applied to the control electrode of an electron discharge device 4 through capacitor 5, the device 4 forming the heterodyne mixer or convertor stage for the receiver. Capacitor 5 is coupled between one extremity of coil 3 and the previously-mentioned control electrode, the other extremity of this coil being connected to ground. The anode of device 4 is connected to a unidirectional potential source B+ through the primary winding 6 of a conventional intermediate frequency transformer 7, this winding being tuned to the intermediate frequency by capacitor 8. The secondary winding 9 of transformer 7 is similarly tuned to the intermediate frequency by capacitor 10, and the intermediate frequency output therefrom is applied to conventional amplifier and detector stages of the receiver, not shown, by way of terminals 11. The cathode of device 4 is connected to ground through the usual self-biasing resistor 12 which is by-passed by capacitor 13. The control electrode of device 4 is connected to ground through a choke coil 14, this coil having relatively low resistance to unidirectional current.

The control electrode of device 4 is further connected to a push button assembly 15, this assembly having push button contacts 16—22, and a common contact bar 23, the contact bar being connected to the aforementioned control electrode. In the diagram, the push button contact 16 is shown closed and making connection to the common contact bar 23. Contact 16 is connected likewise to a tuning inductance 24 which is adjusted to tune the control electrode circuit of device 4 to the frequency of a desired incoming signal. The extremity of inductance 24 remote from contact 16 is coupled to ground through capacitor 25.

I provide likewise a local oscillator circuit permanently connected with contact 16 and which comprises a triode 26 enclosed in envelope 27, this triode preferably being one of a pair of triodes enclosed in this envelope. The oscillator shunt tuned circuit consists of capacitor 28 and coil 29, one of these components being adjustable to pre-set the frequency of the local oscillator. One end of tuned circuit 28—29 is coupled to ground through capacitor 25, and the other end thereof is coupled to the control electrode of triode 26 through a capacitor 30. A grid leak resistor 31 is connected between the control electrode and the cathode of device 26. The cathode of device 26 is connected to a tap on inductance 29 to form a well-known type of oscillator circuit. The anode of device 26 is connected to a source of unidirectional potential 32 through resistor 33, the anode being by-passed to ground through capacitor 34.

In a like manner, triode 35 is connected as a local oscillator in circuit with contact 17 and like components to those previously described are indicated by like indicia with primes attached thereto. Similar oscillators are connected to push button contacts 18—22, and, for purposes of simplicity, the details of these oscillator circuits are not shown. It is to be understood that this invention contemplates the provision of as many oscillators similar to those previously discussed in connection with push button contacts 16 and 17, as may be required, the number of oscillators depending upon the number of pre-set positions desired in the tuning system. The oscillators' radio frequency coils 29, 29′ and capacitors 28, 28′ are pre-set to condition the receiver to receive particular signals, each oscillator providing a heterodyning frequency of such value that currents of intermediate frequency are produced in the output circuits of device 4. It may be desired that one push button be used for manual tuning, and in this case, for example, when contact 16 is selected as the manual tuning button, inductance 24 and capacitance 28 or inductance 29 may be arranged for manual adjustment. Such adjustment preferably may be obtained by a unicontrol mechanism and a control knob located on the receiver panel. The usual dial scale and pointer preferably may be associated therewith in the usual manner.

Excitation from the individual oscillator stages is applied to the control electrode of electron discharge device 4 in three different ways, operating either singly or in combination. Capacitor 25 may be so chosen that there is sufficient oscillator potential thereacross to provide the required excitation by way of inductance 24. When this method does not provide sufficient excitation, or when it is desired for circuit reasons to use separate alternating current paths for the high frequency and oscillator currents, a small capacitor 36 may be connected between inductance 24 and capacitance 28, as shown in the figure. Yet a third way of providing excitation may be obtained by suitably positioning inductances 24 and 29 to provide inductive coupling of the required degree.

Signals received by antenna 1 are applied to the control electrode of discharge device 4 through coupling capacitor 5, and assuming push button 16 to be depressed coil 24 is adjusted to resonate the control electrode circuit of device 4 at the frequency of a desired signal. The resonating capacitance of the control electrode circuit of device 4 comprises the input capacitance of the device, wiring capacitance, etc. The oscillator frequency is pre-set by the tuning elements 28—29 to provide the correct heterodyne frequency.

In the receiver circuit described the oscillator connected with push button contact 16 does not oscillate unless the contact is closed to common contact bar 23, as it is through this connection that a unidirectional current path is provided from the cathode of device 26 to ground. This condition exists for the other oscillator stages, each stage oscillating only when the push button contact corresponding thereto is closed. Hence, closing contact 16 accomplishes two things; it closes the control electrode circuit of the heterodyne device 4 to the corresponding tuning coil 24, and in addition it completes through coil 29, coil 24, contacts 16—23, and coil 14, the direct current ground return of the oscillator discharge device 26. As a consequence of this dual performance of a push button assembly only one bank or set of contacts is necessary in the tuning system.

Referring now to Fig. 2, in which components similar to those in Fig. 1 are indicated by like indicia the tuning system is so arranged that the push buttons connect the positive terminal of the unidirectional potential source 32 to the anode of appropriate oscillator discharge devices, instead of connecting the respective cathodes to ground, as in the previous instance. In this embodiment, the circuit of a single oscillator only, connected to contact 16 is shown, although similar circuits are understood to be connected to contacts 17—22 depending upon the number of pre-set positions desired.

In Fig. 2, because of the unidirectional potential on switch bar 23, a blocking capacitor 37 is required between this common connecting bar and the control electrode of device 4. Grid leak resistor 38 connects the control electrode of device 4 to ground to complete the unidirectional current path of the control electrode circuit.

The low potential end of choke coil 14, instead of being directly connected to ground is by-passed thereto by capacitor 39. The positive terminal of unidirectional potential source 32 is connected to the junction of coil 14 and capacitor 39 through a series filter resistor 40. The low potential end of coil 29 is directly connected to ground in this embodiment. Anode filtering resistor 33, instead of being connected directly to source 32, is now connected to the junction between coil 24 and capacitor 25.

When push button contact 16 is closed, as shown, positive unidirectional potential is applied to the anode of the oscillator discharge device 26 from the positive terminal of source 32 through resistor 40, coil 14, contact 23—16, coil 24 and resistor 33. Since the cathode of device 26 is coupled to ground, and hence to the negative terminal of source 32, the unidirectional current path of the device is therefore completed when push button 16 is depressed.

As previously, coil 24 is pre-set to tune the heterodyne discharge device 4 control electrode circuit to a desired signal frequency, and elements 28—29 are adjusted to provide the correct heterodyne frequency. It is evident that as contact 16 is opened, oscillator 26 ceases to operate due to the opening of the anode unidirectional potential supply circuit.

In the embodiment of Fig. 3, a radio frequency amplifier stage precedes the heterodyne mixer stage, the incorporation of such an amplifier stage being desirable to prevent excessive radiation from the local oscillators. The radio frequency amplifier acts as a buffer to isolate the antenna from the oscillator potential present on the control electrode of the heterodyne discharge device.

Referring now to Fig. 3, the radio frequency amplifier stage comprises an electron discharge device 41. The control electrode of discharge device 41 is connected directly to ground, and the cathode of this device is coupled to ground through radio frequency chock coil 42 and resistor 43. Radio signals intercepted by antenna 1 are applied to coil 44 by way of transmission line 2. One extremity of coil 44 is connected to ground, and the other extremity thereof is coupled to the cathode of device 41 through isolating capacitor 45. Coil 44 is made broadly resonant with the cathode input capacitance of device 41 to the center of the frequency band of the desired signals. A choke coil 46 is provided in the anode circuit of device 41, the anode of this device being connected therethrough to unidirectional potential B+. Anode of device 41 is further coupled to the input circuit of device 4 through blocking capacitor 5. In other respects the present circuit is similar to the previously described circuits of Figs. 1 and 2.

This invention therefore provides a push button tuning system for frequency modulation receivers and the like, each push button contact in the system performing the dual function of completing the unidirectional current path to its associated oscillator stage, and also simultaneously inserting a pre-tuned inductance into the heterodyne mixer stage control electrode circuit. Hence, one bank or set of contacts only is required in the tuning system, which greatly simplifies the system and tends to reduce the cost and increase the reliability of the system.

Inasmuch as oscillator elements are not switched in the proposed system, but only unidirectional potential is connected to the individual oscillators by means of the push button system, irregularity in the push button contacts cannot cause oscillator frequency maladjustment and a practically fool-proof system is thereby obtained.

While certain specific embodiments have been shown and described, it will of course be understood that various modifications may be made without departing from the invention. The appended claims are therefore intended to cover any such modifications as fall within the true spirit and scope of the invention.

What I claim as new and desire to secure by Letters Patent of the United States is:

1. In a radio receiving system, the combination of an antenna circuit, a heterodyne mixer electron discharge device including a control electrode and an anode, a plurality of normally-deenergized, pretuned, heterodyne oscillator stages, a corresponding plurality of tunable input circuits arranged to be selectively connected in circuit with said control electrode, means for coupling said antenna circuit to said control electrode, means comprising a plurality of electrical contacts operable one at a time for selectively connecting a selected one of said oscillator stages and a selected one of said associated tunable input circuits to said control electrode and for isolating the remainder of said stages and circuits from said control electrode, each selected contact also further completing the unidirectional voltage supply circuit of the selected oscillator stage, said oscillator stages oscillating at selected frequencies and said associated tunable input circuits being tuned respectively to the frequencies of desired signals intercepted by said antenna circuit, and means for deriving selected signals from said anode, said selected signals having an intermediate carrier frequency corresponding to the difference between the carrier frequency of said desired signals intercepted by said antenna circuit and the selected oscillator frequency.

2. In a radio receiving system, the combination of an antenna circuit, a heterodyne mixer electron discharge device including a control electrode and an anode, and a plurality of normally-deenergized, pretuned, heterodyne oscillator stages, a corresponding plurality of tunable input circuits arranged to be selectively connected in circuit with said control electrode, means for coupling said antenna circuit to said control electrode, means for selectively connecting said oscillator stages and said associated tunable input circuits to said control electrode, said last-mentioned means comprising a plurality of electrical contacts including a single contact for completing each of said oscillator circuits and its associated one of said tunable input circuits, each of said single contacts completing the unidirectional voltage supply circuit to its associated oscillator stage, said oscillator stages oscillating at selected frequencies and said associated tunable input circuits being tuned respectively to the frequencies of desired signals intercepted by said antenna circuit, and means for deriving selected signals from said anode, said selected signals having an intermediate carrier frequency corresponding to the difference between the carrier frequency of said desired signals intercepted by said antenna circuit and the selected oscillator frequency.

3. In a radio receiving system, an antenna circuit, a heterodyne mixer electron discharge device including a control electrode and an anode, a push button tuning device including a single bank of electrical contacts and a common contact bar, a plurality of tunable circuits respectively connected to said contacts, and a plurality of heterodyne oscillator stages respectively coupled to said contacts through said respective tunable circuits, means for coupling said antenna circuit to said control electrode, means for connecting said common contact bar to said control electrode, and means for selectively connecting said electrical contacts to said common contact bar, said oscillator stages oscillating at selected frequencies and said tunable circuits being tuned respectively to the frequencies of desired signals intercepted by said antenna circuit, and means for deriving selected signals from said anode in response to the selective connection of said electrical contacts to said common contact bar, said selected signals having an intermediate carrier frequency corresponding to the difference between the carrier frequency of said desired signals intercepted by said antenna circuit and the selected oscillator frequency.

4. In a radio receiving system, the combination of an antenna circuit, a radio frequency amplifier stage, a heterodyne mixer electron discharge device including a control electrode and an anode, a plurality of tunable input circuits arranged to be selectively connected in circuit with said control electrode, and a plurality of normally-deenergized heterodyne oscillator stages, means including said radio frequency amplifier stage for amplifying desired signals intercepted by said antenna circuit, means for applying said amplified signals to said control electrode, means comprising a plurality of electrical contacts operable one at a time for selectively connecting a selected one of said tunable input circuits and a selected one of said oscillator stages to said control electrode, said last-mentioned means simultaneously selectively conditioning said electron discharge device to respond to said desired signals and completing the unidirectional voltage supply circuit to the selected oscillator stage, and means for deriving selected signals from said anode, said selected signals having an intermediate carrier frequency corresponding to the difference between the carrier frequency of said desired signals intercepted by said antenna circuit and the selected oscillator frequency.

5. In a radio receiving system, the combination of an antenna circuit, a radio frequency amplifier stage, a heterodyne mixer electron discharge device including a control electrode and an anode, and a plurality of normally-deenergized, pretuned, heterodyne oscillator stages, a corresponding plurality of tunable input circuits arranged to be selectively connected in circuit with said control electrode, means including said radio frequency amplifier stage for amplifying desired signals intercepted by said antenna circuit, means for applying said desired amplified signals to said control electrode, means comprising a plurality of selectively-movable, single-pole contact members each arranged when actuated simultaneously to complete three circuits through a common contact member for respectively connecting a selected one of said oscillator stages and a selected one of said associated tunable input circuits to said control electrode and completing the unidirectional voltage supply circuit to the selected oscillator stage, said oscillator stages oscillating at selected frequencies and said associated tunable input circuits being tuned respectively to the frequencies of said desired signals, and means for deriving selected signals from said anode, said selected signals having an intermediate carrier frequency corresponding to the difference between the carrier frequency of said desired signals intercepted by said antenna circuit and the selected oscillator frequency.

6. In a radio receiving system, the combination of an antenna circuit, a heterodyne mixer electron discharge device including a control electrode and an anode, a plurality of tunable input circuits arranged to be selectively connected in circuit with said control electrode, and a plurality of normally deenergized heterodyne oscillator stages, means for coupling said antenna circuit to said control electrode, means comprising a plurality of electrical contacts operable one at a time for selectively connecting a selected one of said tunable input circuits and a selected one of said oscillator stages to said control electrode and for isolating the remainder of said circuits and stages from said control electrode, each contact also further completing a circuit for energizing said selected oscillator stage, said last mentioned means selectively conditioning said electron discharge device to desired signals intercepted by said antenna circuit, and means for deriving selected signals from said anode, said selected signals having an intermediate carrier frequency corresponding to the difference between the carrier frequency of said desired signals intercepted by said antenna circuit and the frequency of the selected oscillator.

ROBERT B. DOME.

REFERENCES CITED

The following references are of record in the file of this patent:

UNITED STATES PATENTS

| Number | Name | Date |
|---|---|---|
| 2,068,002 | Batchelor | Jan. 19, 1937 |
| 2,159,159 | Horle | May 23, 1939 |
| 2,173,898 | Conron | Sept. 26, 1939 |
| 2,211,041 | Albright | Aug. 13, 1940 |
| 2,263,613 | Conron | Nov. 25, 1941 |
| 2,383,322 | Koch | Aug. 21, 1945 |